United States Patent
Häcker et al.

(10) Patent No.: US 10,697,847 B2
(45) Date of Patent: Jun. 30, 2020

(54) OVERPRESSURE ENCAPSULATION SYSTEM FOR EXPLOSION PROTECTION, AND CORRESPONDING OPERATING METHOD

(71) Applicant: Dürr Systems AG, Bietigheim-Bissingen (DE)

(72) Inventors: Jens Häcker, Markgröningen (DE); Alexander Carls, Herrenberg (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 201 days.

(21) Appl. No.: 15/774,131

(22) PCT Filed: Nov. 4, 2016

(86) PCT No.: PCT/EP2016/001831
§ 371 (c)(1),
(2) Date: May 7, 2018

(87) PCT Pub. No.: WO2017/084743
PCT Pub. Date: May 26, 2017

(65) Prior Publication Data
US 2018/0321109 A1    Nov. 8, 2018

(30) Foreign Application Priority Data

Nov. 20, 2015  (DE) ........................ 10 2015 015 089

(51) Int. Cl.
*G01M 3/26* (2006.01)
*B25J 19/00* (2006.01)
(Continued)

(52) U.S. Cl.
CPC ........... *G01M 3/26* (2013.01); *B25J 19/0079* (2013.01); *G01M 3/283* (2013.01); *B25J 11/0075* (2013.01)

(58) Field of Classification Search
CPC ....... G01M 3/26; G01M 3/283; B25J 19/0079
(Continued)

(56) References Cited

U.S. PATENT DOCUMENTS

| 3,766,844 A | * | 10/1973 | Donnelly | F24F 3/1603 |
| | | | | 454/238 |
| 2006/0261192 A1 | * | 11/2006 | Haas | B05B 13/0431 |
| | | | | 239/533.1 |
| 2008/0287050 A1 | * | 11/2008 | Krogedal | B25J 19/0079 |
| | | | | 454/238 |

FOREIGN PATENT DOCUMENTS

| CN | 2819200 Y | 9/2006 |
| CN | 101351311 | 1/2009 |

(Continued)

OTHER PUBLICATIONS

Chinese Office Action dated Nov. 28, 2019 regarding Chinese Patent Application No. 201680067612.X with Search Report from the China National IP Administration (13 pages).
(Continued)

*Primary Examiner* — Nimeshkumar D Patel
*Assistant Examiner* — Jean F Morello
(74) *Attorney, Agent, or Firm* — Bejin Bieneman PLC

(57) ABSTRACT

The disclosure relates to an overpressure encapsulation system for explosion protection, comprising the following:
a device (1), in particular a painting robot (1),
an overpressure-encapsulated device housing (2) comprising a housing outlet (6) for discharging gas out of the device housing (2),
a compressed air system (3, 4) for operating the device (1), said compressed air system (3, 4) being arranged within the device housing (2),
a sensor assembly (7, 8, 9) for measuring at least one fluid variable (Q, PI, PA), and
an analysis unit (11) which analyzes the fluid variable (Q, PI, PA) measured by the sensor assembly (7, 8, 9), in
(Continued)

particular in order to detect a leakage of the device housing (2). The disclosure proposes that, when a leakage of the device housing (2) starts, the analysis unit (11) ascertains a remaining run time until a required maintenance operation or until a system failure on the basis of the measured fluid variable (Q, PI, PA) and/or detects a fault (14, 16) of the compressed air system (3, 4) on the basis of the measured fluid variable (Q, PI, PA). The disclosure further relates to a corresponding operating method.

16 Claims, 3 Drawing Sheets

(51) Int. Cl.
*G01M 3/28* (2006.01)
*B25J 11/00* (2006.01)

(58) Field of Classification Search
USPC .............................................. 73/40
See application file for complete search history.

(56) References Cited

FOREIGN PATENT DOCUMENTS

| | | |
|---|---|---|
| CN | 102177002 A | 9/2011 |
| CN | 102563362 A | 7/2012 |
| DE | 10 2014 109 731 A1 | 1/2016 |
| JP | H05-115 111 A | 5/1993 |
| JP | H05115111 | 5/1993 |
| JP | 2013 111697 A | 6/2013 |
| WO | 2007/074416 A2 | 7/2007 |

OTHER PUBLICATIONS

International Search Report and Written Opinion for PCT/EP2016/001831 dated Jan. 26, 2017 ( 11 pages; with English translation).

* cited by examiner

OVERPRESSURE ENCAPSULATION SYSTEM FOR EXPLOSION PROTECTION, AND CORRESPONDING OPERATING METHOD

CROSS-REFERENCE TO RELATED APPLICATIONS

This application is a national stage of, and claims priority to, Patent Cooperation Treaty Application No. PCT/EP2016/001831, filed on Nov. 4, 2016, which application claims priority to German Application No. DE 10 2015 015 089.8, filed on Nov. 20, 2015, which applications are hereby incorporated herein by reference in their entireties.

The disclosure relates to an overpressure encapsulation system for explosion protection, in particular in a painting installation for the painting of motor vehicle body components. The disclosure further relates to a corresponding method for operating an overpressure encapsulation system of this type.

When devices (e.g. painting robots, electropneumatic switchgear combinations) are operated in potentially explosive areas (e.g. paint booths) the devices must be explosion-protected. One possibility for doing this is overpressure encapsulation of the devices, wherein the devices are housed in an overpressure-encapsulated device housing, which is protected against the penetration of an explosive gas mixture from the potentially explosive atmosphere into the housing by means of permanent over-pressurization with air. Overpressure encapsulation systems of this type are also standardized in technical standard DIN EN 60079-2. A concrete example of such an overpressure encapsulation system is also described in WO 2007/074416 A2. This known overpressure encapsulation system also provides pressure and flow volume measurements at a housing outlet, wherein a potential leakage of the device housing can be identified from the readings.

A disadvantage of this known overpressure encapsulation system is that it can only detect an existing leakage of the device housing, which then requires immediate maintenance and shut-down of the device.

A further disadvantage of the known overpressure encapsulation system is due to the fact that a compressed air system is arranged in the overpressure-encapsulated device housing, said compressed air system serving, for example, to operate the painting robots or the application technology in a painting robot. This compressed air system can contain compressed air tubes and control valves, for example. Fault cases can likewise occur in this compressed air system in the overpressure-encapsulated device housing, such as e.g. a continuous leakage from the compressed air system or a sudden leakage out of the compressed air system, for example on detachment or bursting of a compressed air tube.

DE 10 2014 109 731 A1, like the publication WO 2007/074416 A2 cited above, describes a conventional robot with explosion protection encapsulation, which can be flushed with an inert gas. However, in this case there is no compressed air system arranged inside the explosion protection encapsulation to operate the robot and which can become defective.

Finally, for the general technical background of the disclosure JP H05-115 111 A has to be mentioned. However, this publication is foreign to the classification in question, since it merely describes a gas-tight transformer.

DETAILED DESCRIPTION

Figure 1:
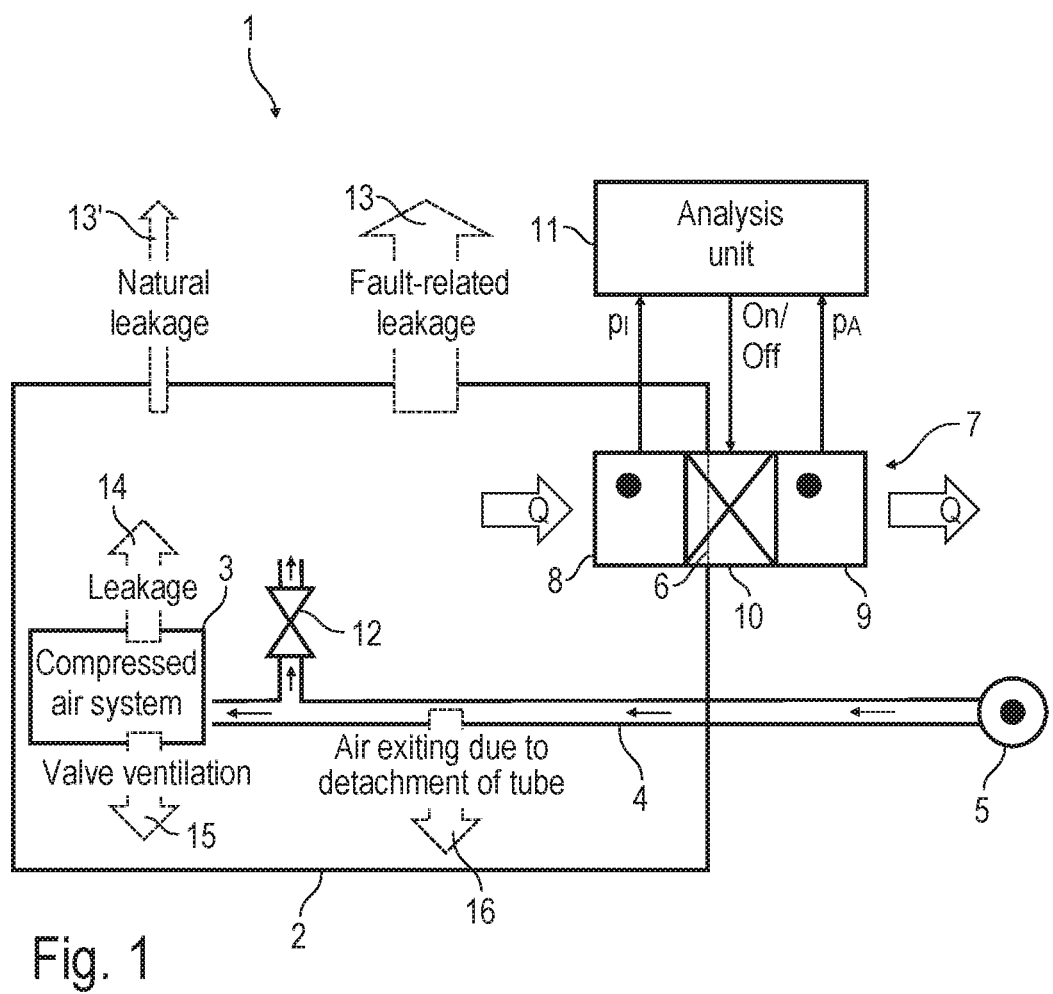
FIG. 1 a schematic illustration of an overpressure encapsulation system according to the disclosure for a painting robot, FIG. 2 a diagram to illustrate the slow drop in internal pressure of the overpressure-encapsulated device housing when a leakage of the device housing starts, FIG. 3 a flow diagram to illustrate the calculation of remaining runtime when a leakage of the device housing starts, FIG. 4 a diagram to illustrate the flow volume from the housing outlet of the device housing in different operating conditions and fault cases, and FIG. 5 a flow diagram to illustrate recognition and differentiation of different operating conditions of the compressed air system on the basis of the measured fluid variable.

The examples described herein improve the above-described overpressure encapsulation system. The disclosure provides a correspondingly improved operating method for such an overpressure encapsulation system.

The overpressure encapsulation system for explosion protection according to the disclosure first of all includes a device, for example a painting robot or an electro-pneumatic switchgear combination. However, in terms of the type of device to be protected, the disclosure is not restricted to painting robots or electro-pneumatic switchgear combinations, but it can also be realized with other types of device.

In this respect it should be mentioned that the device includes a device housing with an overpressure encapsulation, in order to provide explosion protection for the device, in particular in accordance with technical standard DIN EN 60079-2. Such an overpressure encapsulation for a device housing is known per se from the prior art and therefore requires no further description.

There is a housing outlet in the device housing to discharge gas out of the device housing into the surrounding atmosphere. This is important, for example, if the device housing is flushed with a non-explosive gas (e.g. compressed air, inert gas) before the start of operation, in order to remove a potentially explosive atmosphere from the interior of the device housing, wherein the potentially explosive atmosphere escapes out of the device housing through the housing outlet. Such a process of flushing through the housing outlet is likewise known per se from the prior art.

Moreover, in keeping with the prior art, the overpressure encapsulation system according to the disclosure includes a compressed air system, which is arranged at least partially inside the overpressure-encapsulated device housing and serves to operate the device. For example, the compressed air system can have pneumatically controlled coating agent valves for controlling a coating agent flow. The above is not necessary for the system according to the invention. Although these elements are present, they have no influence upon leak detection.

The compressed air system can further comprise a control valve for controlling a compressed air flow, for example for controlling a pneumatically controlled coating agent valve. The compressed air system can further comprise a compressed air line (e.g. compressed air tube) in the overpressure-encapsulated device housing to convey a compressed air stream. The compressed air system can generally serve to control the application technique of the painting robot. Such compressed air systems are also sufficiently known from conventional painting robots, for example, and therefore require no further description.

The overpressure encapsulation system according to the disclosure further includes a sensor assembly for measuring a fluid variable (e.g. pressure, flow volume) in the device housing, at the housing outlet and/or in the surrounding atmosphere. Such sensor assemblies for measuring pressure and/or flow volume at an overpressure-encapsulated device housing are likewise sufficiently known from the prior art and therefore require no further description.

In keeping with the prior art, the overpressure encapsulation system according to the disclosure additionally includes an analysis unit, which is connected to the sensor assembly on the inlet side and analyzes the fluid variable measured by the sensor assembly, in particular in order to detect a leakage of the device housing.

To this extent, the features of the overpressure encapsulation system according to the disclosure are already known from the prior art described above. The disclosure is distinguished from the prior art by improved analysis of the measured fluid variable, in order to obtain additional information from it.

In one example, when a leakage from the overpressure-encapsulated device housing starts, the analysis unit ascertains a remaining runtime until a required maintenance operation or until a system failure, on the basis of the measured fluid variable. It should be pointed out that the analysis unit in publication WO 2007/074416 A2 can only detect an existing leakage, which then requires the device to be switched off immediately and a maintenance operation to be performed. However, in continuous operation of a painting robot, for example, this is problematic, since operation of the entire painting line has to be interrupted, which is very costly. In contrast to this, this inventive idea allows an incipient leak to be detected at an early stage before a maintenance procedure and hence a system shutdown is required. The maintenance operation (e.g. sealing the overpressure-encapsulated device housing) can then be scheduled to coincide with a break in production, for example at the weekend, so that the normal painting operation of a painting line is hardly affected.

In another example, the analysis unit does not analyze the measured fluid variable, or at least not only, to ascertain whether there is a potential leakage of the overpressure-encapsulated device housing. Rather, the analysis unit derives information from the measured fluid variable about the condition of the compressed air system, in order to detect a fault of the compressed air system (e.g. detachment or bursting of a compressed air tube). Thus, for example, detachment or bursting of a compressed air tube of the compressed air system results in compressed air escaping out of the compressed air system into the overpressure-encapsulated device housing, which can be detected by the sensor assembly. For example, a sudden escape of compressed air out of the compressed air system into the overpressure-encapsulated device housing results in a corresponding sudden increase in the flow volume through the housing outlet into the surrounding atmosphere, which can be detected by the sensor assembly. The overpressure encapsulation system according to the disclosure thus advantageously makes it possible to detect and differentiate between different fault cases of the compressed air system in the overpressure encapsulation system. Hitherto it was only possible to detect such faults of the compressed air system when they led to changes in production quality or failure of the entire system. Furthermore, it has hitherto only been possible to distinguish between different fault cases (e.g. bursting or detachment of a compressed air tube or loss of tightness of the compressed air system) of the compressed air system with a great deal of effort and expense. For example, up until now it was necessary to open the overpressure-encapsulated device housing (e.g. robot housing) to discover the cause of the fault, which is laborious and necessitates a production shut-down.

In one embodiment of the disclosure, the analysis unit considers the flow volume of the gas out of the overpressure-encapsulated device housing through the housing outlet into the surrounding atmosphere as the fluid variable to be analyzed for ascertaining remaining runtime or for detecting a fault of the compressed air system. However, the disclosure is not restricted to embodiments which only consider the flow volume through the housing outlet as an informative fluid variable. Rather, within the framework of the disclosure, it is also possible for fluid variables other than or additional to flow volume to be measured and considered, such as e.g. the internal pressure inside the device housing, ambient pressure outside the device housing or further fluid variables.

It is also possible within the framework of the disclosure to derive the flow volume as an informative fluid variable from the internal pressure and the ambient pressure. In this version of the invention, the sensor assembly therefore comprises an internal pressure sensor, which measures the internal pressure inside the device housing, as well as an ambient pressure sensor, which measures the ambient pressure outside the device housing. The analysis unit can then calculate the flow volume through the housing outlet from the measured internal pressure and the measured ambient pressure and then consider this as an informative fluid variable.

However, another alternative possibility is that the sensor assembly comprises a flow volume sensor, which directly measures the flow volume of the gas through the housing outlet. In this case the flow volume does not then need to be calculated from the internal pressure and the ambient pressure. However, if an internal pressure sensor and an ambient pressure sensor are additionally provided, a plausibility check is possible. It is then possible to calculate a flow volume value from the internal pressure and the ambient pressure and compare this with the flow volume value measured directly by the flow volume sensor. This plausibility check is able to identify measurement errors of the internal pressure sensor, the ambient pressure sensor or the flow volume sensor.

It is also worth mentioning that the sensor assembly may emit a quantitative sensor signal of the at least one measured fluid variable (e.g. flow volume, internal pressure, ambient pressure). This means that the sensor assembly does not only output a qualitative sensor signal that merely indicates when a threshold value is exceeded or fallen below but, instead, the quantitative sensor signal outputs a continuous measurement reading.

A valve, in particular a controllable shut-off valve, can be arranged in the housing outlet in the overpressure encapsulation system according to the disclosure. This can be advantageous to check the leak-tightness of the overpressure encapsulation system at defined pressures.

It has already been mentioned above that, when a leakage of the overpressure-encapsulated system starts, it is possible in a version of the disclosure to calculate the remaining runtime until maintenance is required or until system failure. In this regard, it is worth mentioning that, in the event of a leakage of the overpressure-encapsulated device housing, the fluid variable normally follows a set course over time, which is linear, for example, and can be stored in the analysis unit. The analysis unit then measures the actual temporal course of the measured fluid variable. From the stored (theoretical) temporal course and the measured (actual) temporal course of the fluid variable, the analysis unit can calculate the remaining runtime until a required maintenance operation or until a system failure.

For example, the analysis unit can calculate a statistical trend of the measured fluid variable for this purpose. The analysis unit can then calculate an intersect point between the statistical trend of the measured fluid variable and a predetermined threshold value for the fluid variable. The remaining runtime is then the time that is left before reaching the intersect point between the statistical trend of the predetermined threshold value, i.e. the remaining time before the statistical trend falls below the threshold value.

It has already been mentioned above that a version of the disclosure offers the possibility of detecting a fault case of the compressed air system in the overpressure-encapsulated device housing. To this end, the analysis unit can analyze the temporal course of the measured fluid variable (e.g. flow volume through the housing outlet) and compare it with known, fault-typical forms of the temporal curve, in order to distinguish a fault case of the compressed air system from a normal operating condition of the compressed air system. Moreover, this pattern recognition in the temporal course of the measured fluid variable (e.g. flow volume through the housing outlet) also makes it possible to distinguish between different fault cases of the compressed air system.

For example, the analysis unit can detect the following proper operating conditions of the compressed air system and fault cases and differentiate between them:
  Venting of a control valve of the compressed air system into the device housing, which is a normal operating condition.
  Detachment or bursting of a compressed air tube of the compressed air system associated with a sudden discharge of compressed air out of the compressed air tube into the device housing, which is a first fault case of the compressed air system.
  Loss of leak-tightness of the compressed air system associated with a continuous leakage out of the compressed air system into the device housing, which is a second fault case.

The venting of a control valve as a proper operating condition is manifested by a sudden increase in flow volume through the device outlet into the surrounding atmosphere, followed by a sudden drop in flow volume within a certain time span. The compressed air stream through the housing outlet then only displays a short peak.

On the other hand, detachment or bursting of a compressed air tube of the compressed air system is manifested by a sudden increase in the flow volume out of the device housing, wherein the suddenly increased flow volume then remains high over a certain period of time.

Furthermore, the analysis unit can assume a continuous leakage out of the compressed air system into the device housing if the flow volume out of the device housing increases slowly and continuously.

FIG. 1 shows a schematic illustration of an overpressure encapsulation system for a painting robot 1, wherein the painting robot 1 is only shown schematically and comprises an overpressure-encapsulated robot housing 2.

A compressed air system 3 is located in the overpressure-encapsulated robot housing 2, which is only shown schematically and comprises, for example, pneumatically controlled coating agent valves, control valves to control compressed air streams and a compressed air tube 4, wherein the compressed air tube 4 is fed with compressed air by a standard compressed air supply 5. It should be mentioned in this connection that the compressed air system 3 is required to operate the painting robot 1 and so does not in itself serve as explosion protection.

A housing outlet 6 is located in the wall of the robot housing 2, through which a flow volume Q can escape out of the interior space of the robot housing 2.

A sensor assembly 7 is located in the housing outlet 6, comprising an internal pressure sensor 8 and an ambient pressure sensor 9. The internal pressure sensor 8 measures an internal pressure $p_I$ inside the robot housing 2, while the ambient pressure sensor 9 measures an ambient pressure $p_A$ outside the robot housing 2.

Additionally, the sensor assembly 7 also comprises a controllable flushing valve 10, in order to control the flow volume Q out of the housing outlet.

The sensor assembly 7 is associated with an analysis unit 11, which registers the measured internal pressure $p_I$ and the measured ambient pressure $p_A$ and also controls the flushing valve 10.

In this embodiment, the overpressure encapsulation system according to the disclosure further includes an additional flushing valve 12, which allows compressed air to be conveyed out of the compressed air tube 4 into the interior space of the robot housing 2, for example in a flushing process.

A flushing process is then performed before the start of operation, as is known per se from the prior art, to remove any potentially explosive atmosphere from the interior space of the robot housing 2. This involves opening the two flushing valves 10, 12, so that the potentially explosive atmosphere inside the interior space of the robot housing 2 is driven out and flushed out of the robot housing 2 through the housing outlet 6. During this flushing process, the analysis unit 11 calculates the flow volume Q through the housing outlet 6 from the internal pressure $p_I$ and the ambient pressure $p_A$ and continues the flushing process until it is ensured that any potentially explosive atmosphere is removed from the interior space of the robot housing 2.

The flushing valve 12 can then be closed during actual operation of the painting robot. In contrast, the flushing valve 10 can optionally be left open or be closed, since various operating modes are possible within the scope of the invention.

It should be noted that the flushing valve 10 is usually spring-loaded, so that opening of the flushing valve 10 is affected by mechanical spring force. The designation of flushing valve is therefore somewhat misleading, since it is actually a restrictor or a kind of non-return valve. Only the flushing valve 12 serves to actively introduce air into the robot. In contrast, the flushing valve 10 acts as a restrictor and only opens, if the internal pressure becomes too high.

Various events can then occur during operation of the painting robot and these are shown in the drawing by the dotted block arrows 13, 14, 15 and 16.

Figure 2:
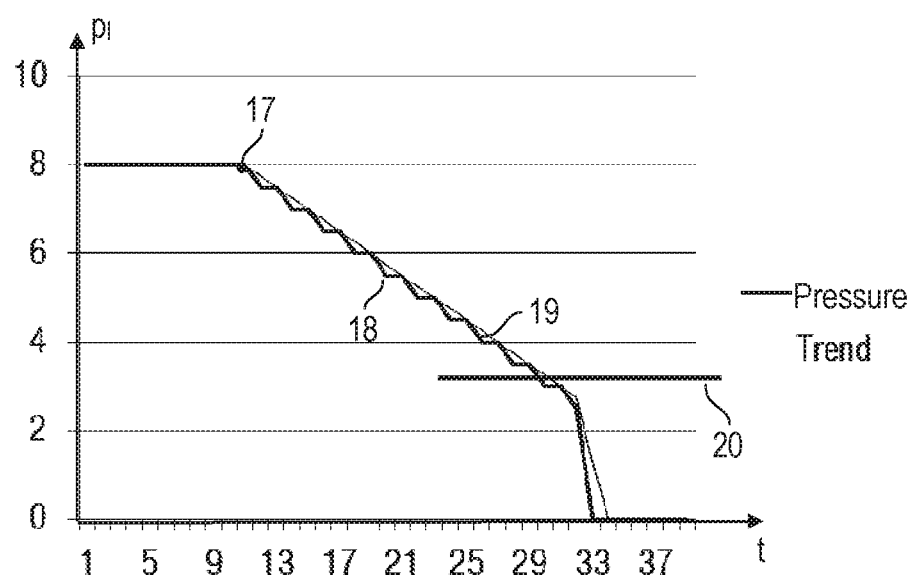

Here block arrow 13 symbolizes a fault-related leakage of the overpressure-encapsulated robot housing 2. This leakage of the robot housing 2 leads to a drop in internal pressure $p_I$ as illustrated in FIG. 2. In this case, the leakage starts at a point 17 and progresses with a temporal course 18, wherein the internal pressure $p_I$ follows a statistical trend 19. It should be pointed out that, in this case, the leakage 13 is fault-related and can be caused, for example, by worn seals or incorrectly mounted lids or covers.

This should be distinguished from a natural leakage 13', which, even with good sealing, cannot be completely avoided, so that a small amount inevitably escapes. In such a system that is not perfectly encapsulated, with a natural leakage 13', a drop in pressure is prevented by feeding in a small quantity of air (fixed setting).

In the case of the fault-related leakage 13, the analysis unit 11 then first calculates the statistical trend 19 from the temporal course 18 of the internal pressure $p_I$. The analysis unit 11 then calculates the time point at which the statistical trend 19 falls below a threshold 20. Finally the analysis unit 11 calculates the remaining runtime before the threshold 20 is fallen below. In this way, if there is a leakage 13 of the robot housing 2, the analysis unit 11 is able to calculate well in advance how much time remains before a maintenance operation is required or before a system failure will occur. In this way, when a leakage of the robot housing 2 starts, required maintenance operations can be scheduled into the normal operating sequence relatively easily.

It is also worth mentioning that, if the operator ignores the warning, operation can nonetheless be maintained over a certain period of time, if the overpressure encapsulation system has a large-capacity flushing valve and a second low-capacity valve or bypass. The robot is then kept operational by means of two-point control.

In contrast, block arrow 15 shows valve venting of a control valve of the compressed air system 3 into the interior space of the robot housing 2. This is not a fault case but a normal operating event, which requires no action. In order to recognize such a valve venting 15, the analysis unit 11 considers the flow volume Q out of the housing outlet 6. In this case the valve venting 15 leads to a sudden increase in the flow volume Q, followed by a similarly sudden drop in the flow volume Q, as illustrated in FIG. 4.

Figure 4:
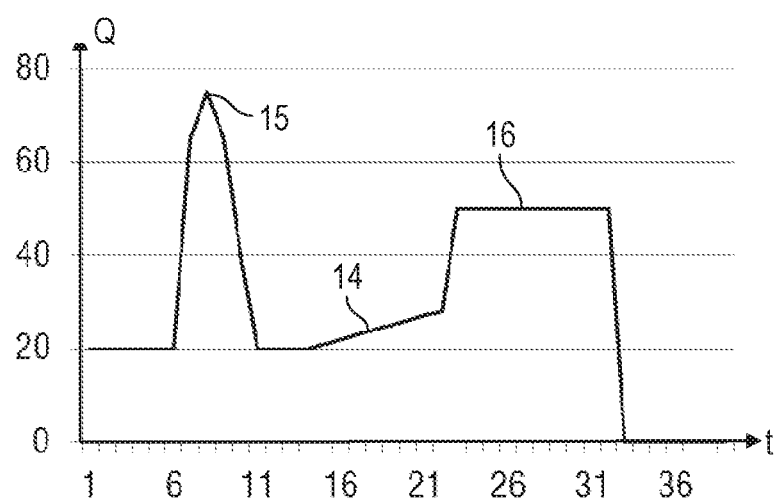

On the other hand, block arrow 14 in the drawing symbolizes a continuous leakage out of the compressed air system 3 into the robot housing 2, which leads to a continuous increase in the flow volume Q out of the housing outlet 6, as illustrated in FIG. 4.

In contrast, block arrow 16 symbolizes a sudden escape of air out of the compressed air tube 4 into the robot housing 2, caused by bursting or detachment of the compressed air tube 4. This leads to a sudden increase in the flow volume Q, which is maintained over a certain period without dropping again, as illustrated in FIG. 4.

Figure 3:
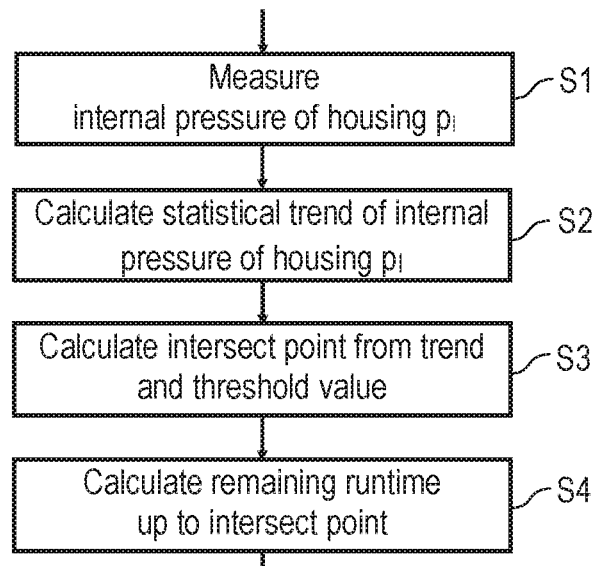

FIG. 3 shows the various steps executed by the analysis unit 11, in order to calculate the remaining runtime in the event of the leakage 13 out of the robot housing 2.

In a first step S1 the internal pressure sensor 8 first of all measures the internal pressure $p_I$ inside the robot housing 2.

In a second step S2 the statistical trend 19 of the internal pressure $p_I$ is then measured.

In a further step S3 the intersect point of the trend 19 and the threshold value 20 is calculated.

Finally, in a step S4, the analysis unit 11 then calculates the remaining runtime before the intersect point, i.e. until a maintenance operation becomes necessary or the system fails.

Figure 5:
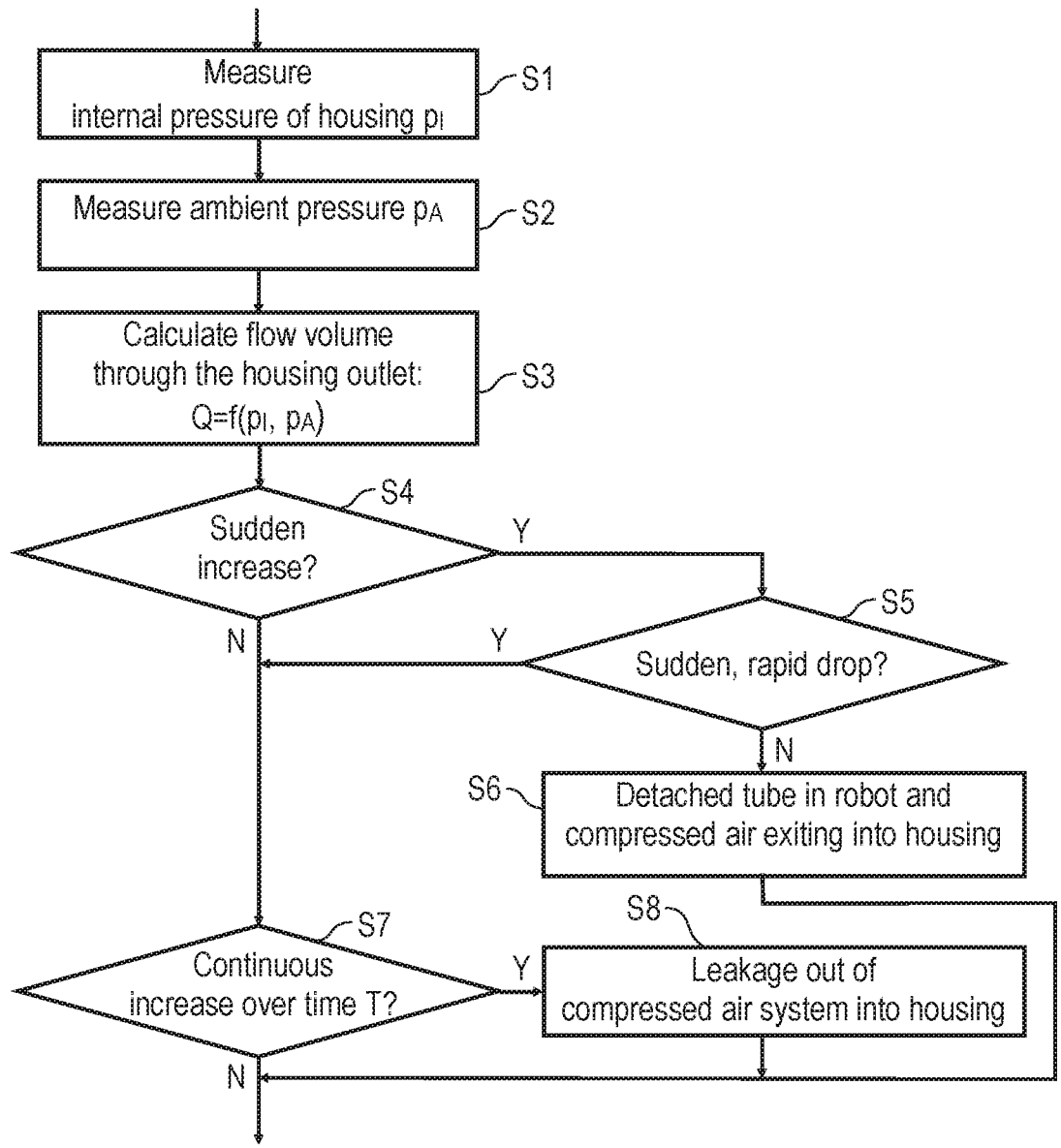

In contrast, FIG. 5 shows the steps executed by the analysis unit 11 in order to differentiate between the events described above, namely the leakage 14 out of the compressed air system 3, the valve venting 15 out of the compressed air system 3 and detachment of the tube 16.

In order to do this, in a first step S1 the internal pressure $p_I$ inside the robot housing 2 is measured.

In a second step S2 the ambient pressure $p_A$ outside the robot housing is then continuously measured.

In a further step S3 the analysis unit then calculates the flow volume Q through the housing outlet 6 from the measured internal pressure $p_I$ and the measured ambient pressure $p_A$.

Alternatively, it is also possible to measure the flow volume Q directly using a flow volume sensor, but this is not shown in the drawings.

In a step S4 it is then first of all checked whether the flow volume Q increases suddenly, as would be the case, for example, on valve venting 15 or detachment of the tube 16. If this is the case, then it is checked in step S5 whether the flow volume then drops again suddenly, which would indicate valve venting 15.

However, if this check reveals that the flow volume does not drop again within a short period, then step S6 recognizes that the compressed air tube 4 has become detached or has burst.

Conversely, if it is found in step S4 that there is no sudden increase in flow volume, then a step S7 checks whether the flow volume Q continues to rise over an extended period, which would indicate leakage 14 of the compressed air system 3.

If necessary, a step S8 then detects that there is a leakage out of the compressed air system 3 into the robot housing 2.

The above steps shown in FIGS. 3 and 5 can be continuously repeated during operation in order to monitor operation.

The disclosure is not limited to the preferred exemplary embodiment described above. Rather, there are a large number of possible variants and adaptations that similarly make use of the ideas of the disclosure and hence fall within the scope of protection. In particular, the disclosure also claims protection for the subject matter and the features of the dependent claims, independently of the claims referred to.

LIST OF REFERENCE NUMERALS

1 Painting robot
2 Overpressure-encapsulated robot housing
3 Compressed air system in the robot housing
4 Compressed air tube to the compressed air system
5 Compressed air supply
6 Housing outlet of the robot housing
7 Sensor assembly
8 Internal pressure sensor
9 Ambient pressure sensor
10 Flushing valve in the housing outlet
11 Analysis unit
12 Flushing valve on the compressed air tube
13 Fault-related leakage out of the robot housing into the surrounding atmosphere
13' Natural leakage out of the robot housing into the surrounding atmosphere
14 Leakage out of the compressed air system into the robot housing
15 Valve venting out of the compressed air system into the robot housing
16 Sudden escape of air out of the compressed air tube due to bursting or detachment of the compressed air tube
17 Start of leaking of robot housing
18 Temporal course of internal pressure $p_I$ on incipient leakage out of the robot housing into the surrounding atmosphere
19 Statistical trend of internal pressure $p_I$
20 Internal pressure threshold
$p_I$ Internal pressure
$p_A$ Ambient pressure
Q Flow volume out of the housing outlet

The invention claimed is:

1. An overpressure encapsulation system for explosion protection, comprising:
    a) a device,
    b) an overpressure-encapsulated device housing for explosion protection for the device,
    c) a housing outlet in the device housing for discharging gas out of the device housing through the housing outlet into a surrounding atmosphere,
    d) a compressed air system for operating the device by means of compressed air, said compressed air system being arranged at least partially inside the overpressure-encapsulated device housing,
    e) a sensor assembly for measuring at least one fluid variable in the device housing, at the housing outlet and/or in the surrounding atmosphere, and
    f) an analysis unit, which is connected to the sensor assembly on an inlet side and analyzes the fluid variable measured by the sensor assembly, wherein
    g) when a leakage of the device housing starts, the analysis unit ascertains a remaining runtime until a required maintenance operation or until a system failure on the basis of the measured fluid variable.

2. An overpressure encapsulation system according to claim 1, wherein the device is a painting robot.

3. An overpressure encapsulation system according to claim 2, wherein the analysis unit considers the flow volume of the gas through the housing outlet as the fluid variable to be analyzed for ascertaining the remaining runtime.

4. An overpressure encapsulation system according to claim 3, wherein the sensor assembly comprises:
    a) an internal pressure sensor, which measures the internal pressure inside the device housing, and
    b) an ambient pressure sensor, which measures the ambient pressure outside the device housing,
    c) wherein the analysis unit calculates the flow volume of the gas through the housing outlet from the measured internal pressure and the measured ambient pressure.

5. An overpressure encapsulation system according to claim 2, wherein the sensor assembly comprises a flow volume sensor, which measures the flow volume of the gas through the housing outlet.

6. An overpressure encapsulation system according to claim 2, wherein the sensor assembly emits a quantitative sensor signal of the at least one measured fluid variable.

7. An overpressure encapsulation system according to claim 2, wherein a valve is arranged in the housing outlet.

8. An overpressure encapsulation system according to claim 2, wherein
    a) in a leakage, the fluid variable follows a predetermined temporal course, which is stored in the analysis unit,
    b) the analysis unit measures the temporal course of the measured fluid variable,
    c) from the stored temporal course and the measured temporal course, the analysis unit calculates the remaining runtime until a required maintenance operation or until a system failure.

9. An overpressure encapsulation system according to claim 2, wherein
    a) the analysis unit calculates a statistical trend of the measured fluid variable,
    b) the analysis unit calculates an intersect point between the statistical trend of the measured fluid variable and a predetermined threshold value for the fluid variable, and
    c) the analysis unit calculates the remaining runtime before the intersect point is reached.

10. An overpressure encapsulation system according to claim 2, wherein the compressed air system of the device contains at least one of the following components:
    a) a pneumatically controlled coating agent valve for controlling a coating agent flow,
    b) a control valve for controlling a compressed air flow,
    c) a compressed air line for conducting a compressed air flow.

11. An overpressure encapsulation system for explosion protection, comprising:
    a) a device,
    b) an overpressure-encapsulated device housing for explosion protection for the device,
    c) a housing outlet in the device housing for discharging gas out of the device housing through the housing outlet into a surrounding atmosphere,
    d) a compressed air system for operating the device by means of compressed air, said compressed air system being arranged at least partially inside the overpressure-encapsulated device housing,
    e) a sensor assembly for measuring at least one fluid variable in the device housing, at the housing outlet and/or in the surrounding atmosphere, and
    f) an analysis unit, which is connected to the sensor assembly on an inlet side and analyzes the fluid variable measured by the sensor assembly,
    g) wherein the analysis unit detects a fault of the compressed air system on the basis of the measured fluid variable.

12. An overpressure encapsulation system according to claim 11, wherein the device is a painting robot.

13. An overpressure encapsulation system according to claim 12, wherein the sensor assembly comprises the following:
    a) an internal pressure sensor, which measures the internal pressure inside the device housing, and
    b) an ambient pressure sensor, which measures the ambient pressure outside the device housing,
    c) wherein the analysis unit calculates the flow volume of the gas through the housing outlet from the measured internal pressure and the measured ambient pressure.

14. An overpressure encapsulation system according to claim 12, wherein the sensor assembly comprises a flow volume sensor, which measures the flow volume of the gas through the housing outlet.

15. An overpressure encapsulation system according to claim 12, wherein the sensor assembly emits a quantitative sensor signal of the at least one measured fluid variable.

16. An overpressure encapsulation system according to claim 12, wherein a valve is arranged in the housing outlet.

* * * * *